Sept. 12, 1967     R. N. WHITE ET AL     3,340,666
LIGHT REFLECTING AND SHIELDING STRUCTURE
FOR SUSPENDED CEILINGS
Filed May 17, 1965     6 Sheets-Sheet 1
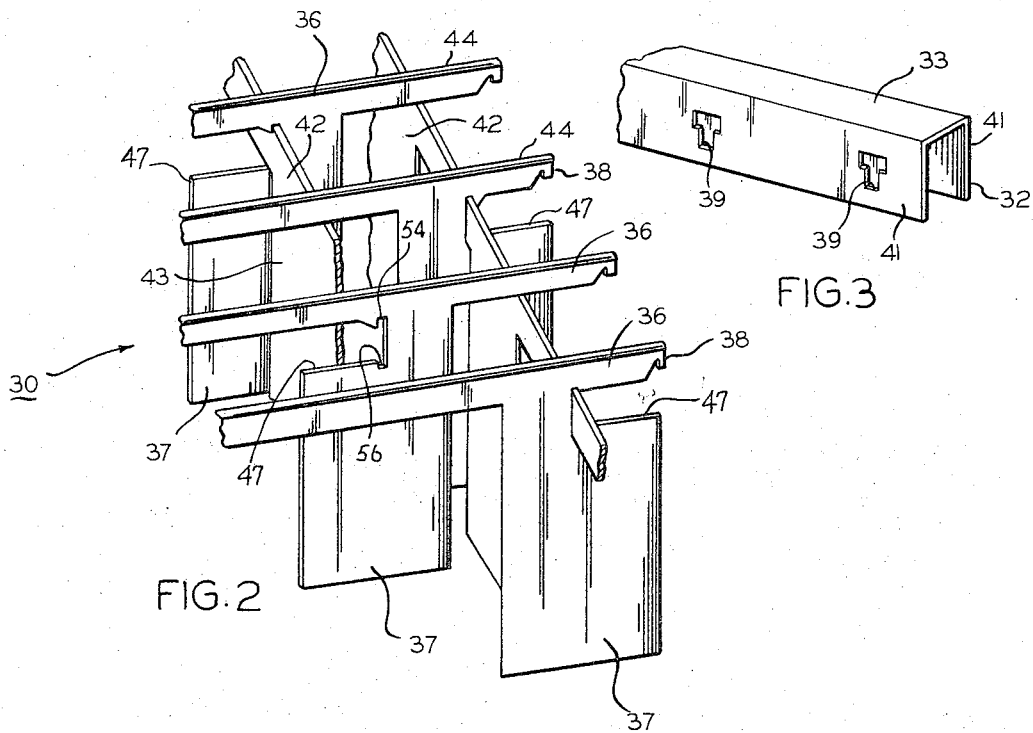
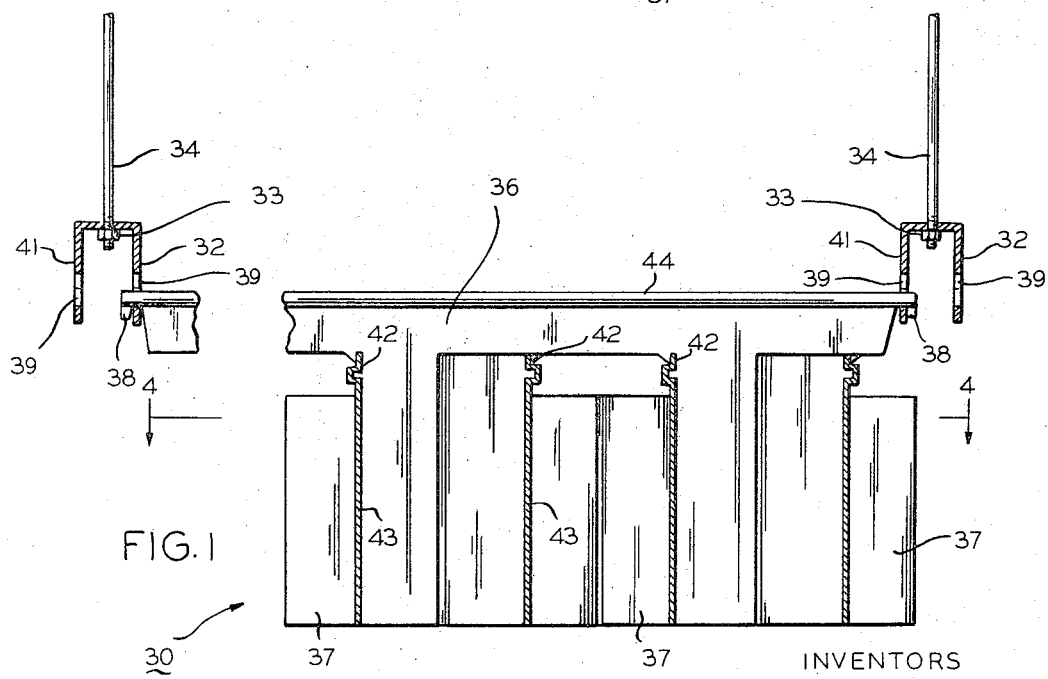
INVENTORS
CHARLES U. DEATON
RICHARD N. WHITE
BY
ATTORNEY

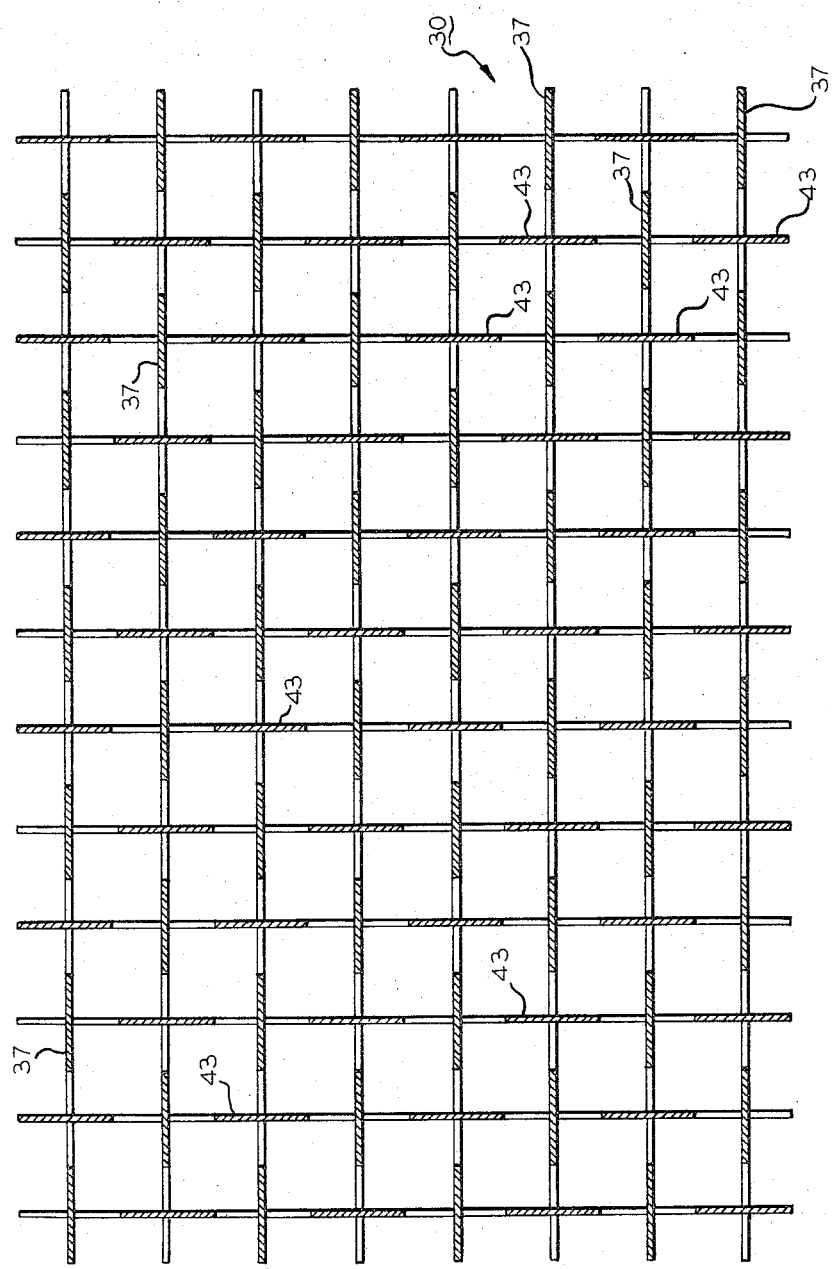

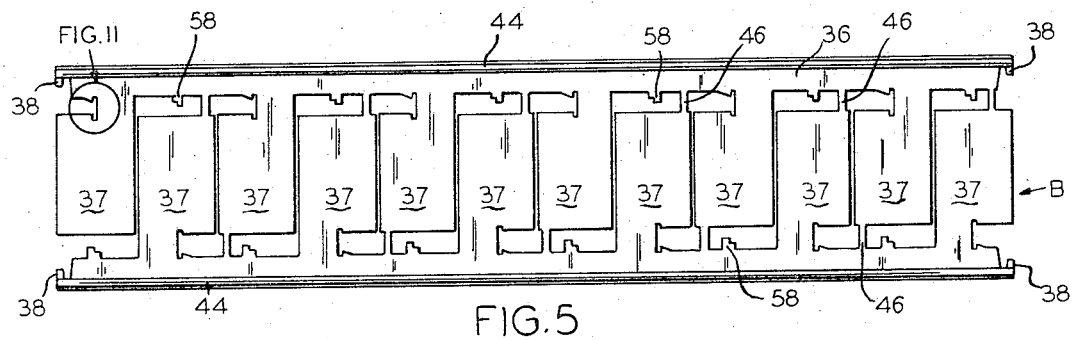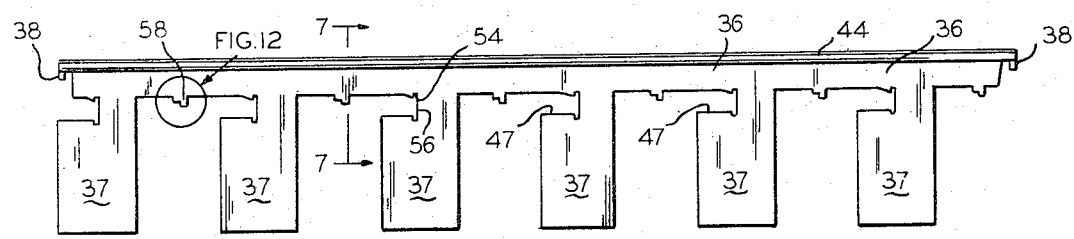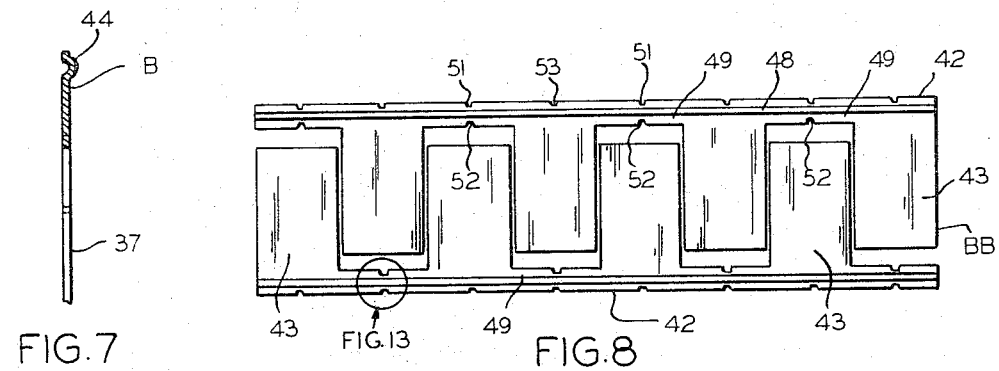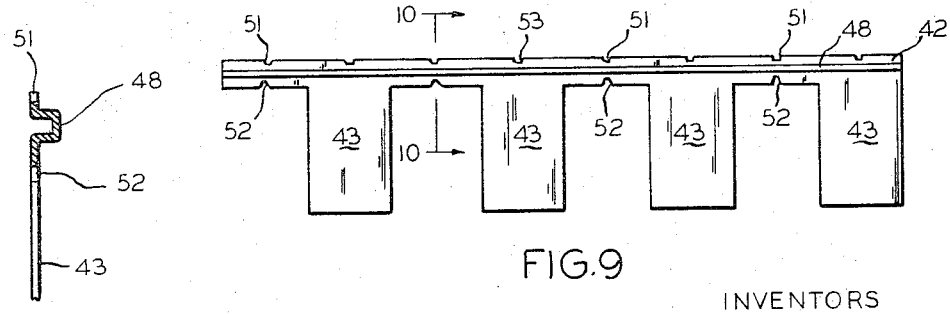

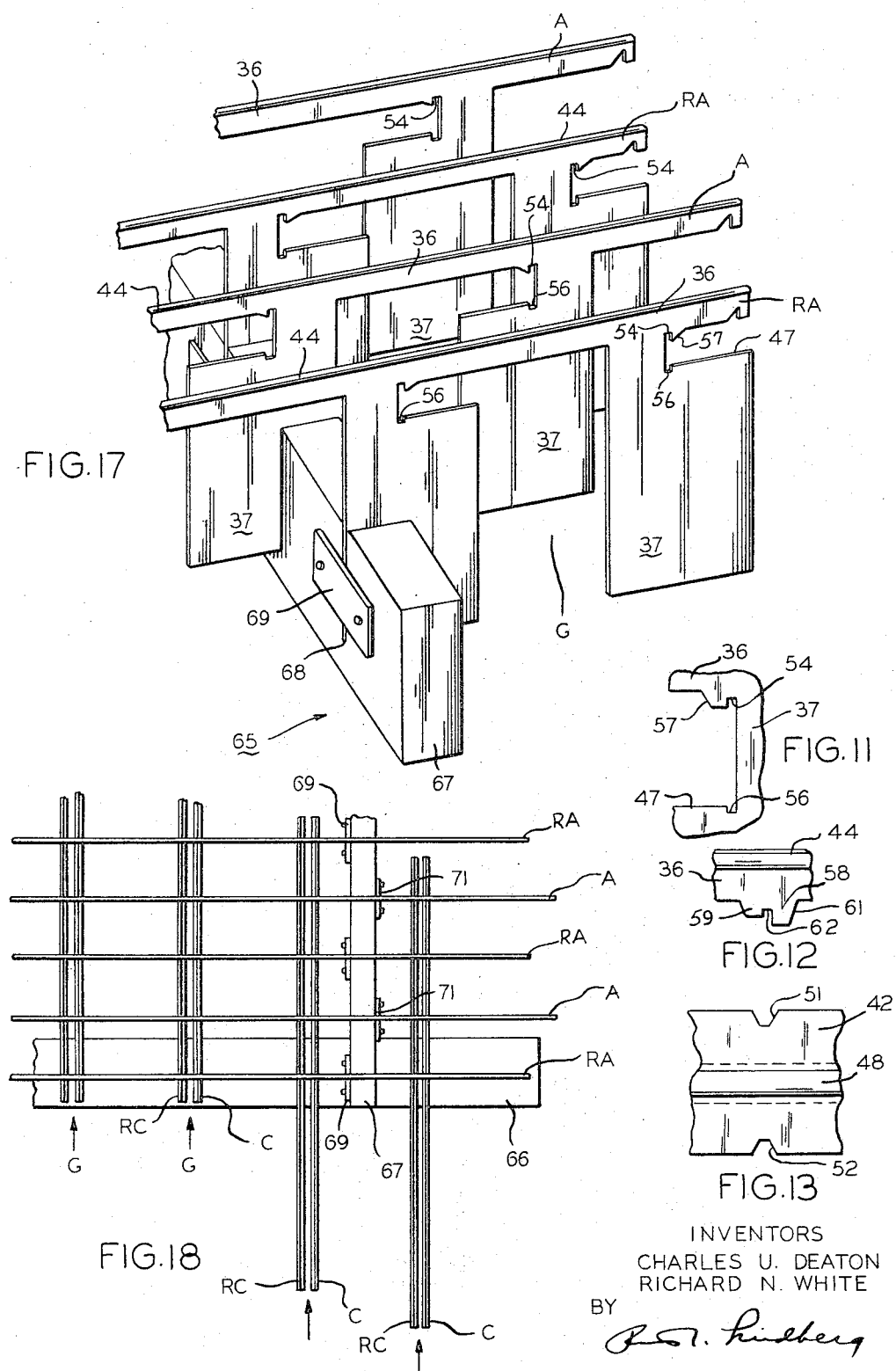

Sept. 12, 1967     R. N. WHITE ET AL     3,340,666
LIGHT REFLECTING AND SHIELDING STRUCTURE
FOR SUSPENDED CEILINGS Filed May 17, 1965     6 Sheets-Sheet 5

INVENTORS
CHARLES U. DEATON
RICHARD N. WHITE
BY

ATTORNEY

INVENTORS
CHARLES U. DEATON
RICHARD N. WHITE
BY
ATTORNEY

United States Patent Office 3,340,666
Patented Sept. 12, 1967

3,340,666
LIGHT REFLECTING AND SHIELDING STRUCTURE FOR SUSPENDED CEILINGS
Richard N. White, Des Plaines, Ill., and Charles U. Deaton, Golden, Colo., assignors to Luminous Ceilings, Inc., Chicago, Ill., a corporation of Illinois
Filed May 17, 1965, Ser. No. 456,418
15 Claims. (Cl. 52—668)

This invention relates generally to improvements in suspended ceiling construction and has particular reference to a light reflecting and shielding structure comprised of pendent light reflecting planar elements lying in parallel and intersecting planes and capable of field assembly into unit modules.

The structure according to the present invention is particularly adapted for those suspended ceiling installations where it is desired to provide shielded direct illumination from overhead fluorescent tubing, and also where it is desired to conceal heating and air conditioning ductwork. The structure according to the invention is adapted to be supported from a pre-constructed grid comprised of modules which may be suspended from the ceiling or other overhead structures. The aforesaid lighting and other equipment can be disposed in position above the so pre-constructed grid.

Each grid module is adapted to support modular light shielding and reflecting baffles constructed as modules and comprised of a first series of laterally spaced discrete planar members which are joined to and intersected by a second series of laterally spaced discrete planar members, the latter being so ararnged that the planar surfaces thereof extend along the open portions between the elements of the first named discrete planar members.

A feature of the present invention is to form both series of planar elements from flat strip stock in such a fashion that there is substantially no waste in the forming process, and to provide each series with proper locking arrangements, so that the entire assembly cannot readily be distorted when it is removed from its supporting grid module.

Another feature is to form the planar elements from flat sheet stock, the stock being passed through suitable dies and deformed in a manner to give the resultant elements proper rigidity for assembly and handling.

The structure according to the invention is characterized in that alternate rows of the first series of the laterally spaced planar members are reversed end for end, the alternate rows occupying a first index position for assembly of the second series of planar members, these being shifted laterally of themselves, and the alternate rows being moved to a second index position to complete the assembly.

A further feature resides in arranging the first series of planar elements in such a fashion that alternate rows thereof are shifted longitudinally as a group with respect to the other planar elements of said first series to present to view a narrow gate or passage extending transversely of all of the laterally spaced first series of elements, so that the second series of elements may be inserted therein and moved laterally of themselves for locking to the first series of planar elements, final locking of all of the elements being achieved by shifting the alternate rows in an opposite direction.

With the foregoing considerations in mind, it is a principal object of this invention to provide a light shielding and reflecting structure characterized by a first series of laterally spaced planar members having discrete and spaced planar elements pendent therefrom and integral therewith, and a second series of intersecting laterally spaced planar members each having discrete and spaced planar elements pendent therefrom and integral therewith, both series of planar members being arranged to lock together with all the planar elements spaced from each other.

Another object is to provide a light shielding structure which is formed entirely from planar elements which can be shipped KD and assembled readily in the field.

Still another object is to provide a light reflecting and shielding module comprised entirely of planar elements which are assembled into an integral whole without the need of auxiliary fastening devices, the planar members being provided integrally with configurations enabling such assembly.

Another object is to provide a light shielding and reflecting structure comprised of planar members as described, and arranged to be brought into locking relationship upon the longitudinal shifting of alternate rows of one set of the planar members.

Still another object is to provide a light shielding and reflecting structure wherein the light reflecting and shielding surfaces thereof are formed wholly by simple and economical stamping operations.

Still another object comprehends the construction of a light reflecting and shielding baffle module consisting entirely of planar members or elements having suitable flexibility making it possible readily to assemble the same, yet having proper rigidity whereby the assembled module may be readily handled.

Another important object comprises a light reflecting and shielding baffle module constructed entirely of planar members and elements cooperating with each other so that the completed baffle module possesses sufficient rigidity as to be readily removed from its supporting grid module for cleaning, for example.

Yet another important object embraces the method of forming planar light shielding and reflecting members and assembling such members into a unitary module.

In the description herein the planar members may be referred to as main leaves pendent from main stems and cross leaves pendent from cross stems.

Other objects and important features of the invention will be apparent from a study of the specification following taken with the drawings which together describe and illustrate a preferred method and embodiment according to the invention, and what is now considered to be the best mode of practising the principles thereof. Other methods and embodiments may be suggested to those having the benefit of the teachings herein, and they are intended to be reserved especially as they fall within the scope of the subjoined claims.

In the drawings:

FIG. 1 is a side elevational view of a light shielding and reflecting structural baffle module for suspending ceilings, said structure embodying the teachings according to the present invention;

FIG. 2 is an isometric detailed view of a portion of the light shielding structural baffle module seen in FIG. 1;

FIG. 3 is an isometric view of a framing section adapted to support the structural baffle module seen in FIGS. 1 and 2;

FIG. 4 is a horizontal sectional view taken along the line 4—4 of FIG. 1 looking in the direction of the arrows;

FIG. 5 is a detailed plan view showing a sheet of flat stock employed in forming elements of the baffle module seen in FIGS. 1 to 4;

FIG. 6 shows a main stem and leaves pendent therefrom formed from the sheet stock seen in FIG. 5;

FIG. 7 is a section taken along the line 7—7 of FIG. 6 looking in the direction of the arrows;

FIG. 8 is a view similar to FIG. 5, but showing a sheet of flat stock employed in forming additional elements adapted to be assembled into the baffle module seen in FIGS. 1 to 4 inclusive;

FIG. 9 shows a cross stem and leaves pendent therefrom formed from the strip stock seen in FIG. 8;

FIG. 10 is a section taken along the line 10—10 of FIG. 9 looking in the direction of the arrows;

FIG. 11 is a detailed view to enlarged scale of that part of the structure contained within the circle marked FIG. 11 in FIG. 5;

FIG. 12 is a detailed view to enlarged scale of that part of the structure contained within the circle marked FIG. 12 in FIG. 6;

FIG. 13 is a detailed view to enlarged scale of that part of the structure contained within the circle marked FIG. 13 in FIG. 8;

FIG. 17 is an isometric view showing the arrangement of the main stems and leaves in the assembly fixture of FIG. 14;

FIG. 18 is a plan view showing how the cross stems and leaves have been moved into a position of assembled relationship with the main stems and leaves seen in FIGS. 14 to 17 inclusive;

Figure 14:
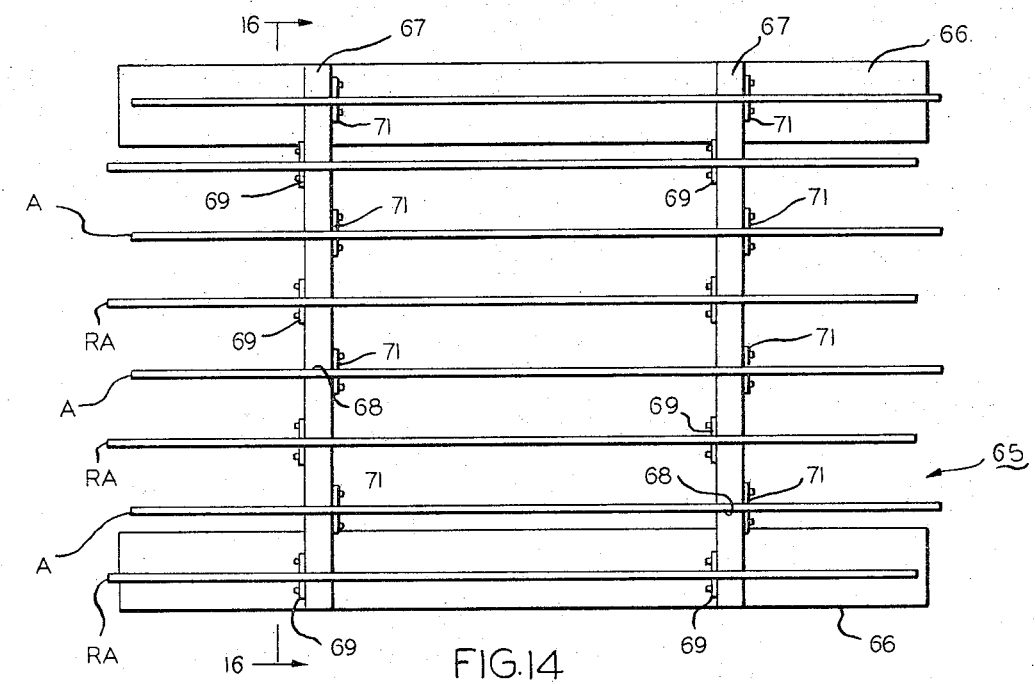
FIG. 14 is a plan view showing the main stem and leaves of FIG. 6 arranged in an assembly fixture.

Referring now particularly to FIGS. 1 to 3 of the drawings, a typical light shield and reflecting structure according to the present invention is in the form of a baffle module referred to by the reference numeral 30, and is arranged to be suspended from overhead or ceiling framing elements, not shown. Each of the modules 30 is arranged to be suspended from grid members 32 shown as channel shaped sections in FIGS. 1 and 3, and having horizontal webs 33 adapted to be supported from a ceiling, not shown, by hanger members 34.

It should be noted that the grid members 32 are intersected at intervals by similar grid members extending at right angles to those seen in FIG. 1 to form a series of grid modules suspended as seen in FIG. 1. The light shielding and reflecting modules 30 are each comprised of planar members, each of these having a main stem 36. Main leaves 37 are pendent from the main stem and are formed integrally therewith. Hooks 38 at each end of the main stems 36 are adapted to engage with spaced openings 39 in dependent flanges 41 from the horizontal web 33 of the grid module member 32. Openings 39 are spaced as shown in FIG. 3 in the vertical flanges 41, and receive the hooked ends 38 of the stems 36 to support the same.

As will be shown, the main stems 36 are in interlocking engagement with cross stems 42, these latter also having cross leaf elements 43 pendent therefrom. When the planar members of one set including main stems 36 and leaves 37, are assembled with the planar members including cross stems 42 and leaves 43, there results a light reflecting and shielding structure which is completely integral without the need of auxiliary fastening devices and providing a module made from complementary interfitting grid-forming elements.

The finished light reflecting and shielding module 30 as seen in FIGS. 1 to 4 is adapted to be supported on the grid module formed of the grid members 32. The modules 30 suspended therefrom are adapted to conceal fluorescent or incandescent lighting equipment, and heating and air conditioning equipment, as desired. When in the position seen, the light reflecting and shielding modules 30 are adapted to diffuse the illumination from the light sources disposed thereabove and not shown.

Referring now to FIGS. 5 to 7 of the drawings the main stem 36 and the leaves 37 pendent therefrom are formed from a sheet of flat stock B which is first put through an embossing die to provide a stiffening curl or bead 44 extending lengthwise along each long edge thereof. After the embossing operation to provide the stiffening bead 44, the blank B is moved progressively through piercing, notching and blanking dies to provide the discrete leaves 37 extending from the stem 36. The two identical half planar members resulting from the aforesaid operations are still joined by connecting tabs 46, and the half planar members are maintained in such joined condition for painting, or other surface finishing operation, after which the connecting tabs 46 are removed in a stamping operation.

After the two halves are parted as seen in FIG. 6, each main stem 36 has the leaves 37 pendent therefrom at intervals as seen. Each of the leaves 37 is provided with an essentially rectangular shaped notch 47 which extends parallel to the stem 36 a distance one-half the width of leaf 37.

As will be shown, the notch 47 is adapted to accommodate the cross stem 42 in such a fashion that the leaves 43 pendent therefrom form with leaves 37 of main stems 36 a reticule or grid when viewed from below the modules 30.

As seen in FIGS. 8 to 10, the cross stems 42 and their pendent leaves 43 are formed in a manner similar to main stems 36 and their pendent leaves 37 and from a sheet of flat stock BB. It is first embossed along its edges to provide stiffening ribs or beads 48. After such embossing operation, the blank BB is moved progressively through piercing, notching and blanking dies to provide the stems 42 and leaves 43 as seen in FIGS. 8 and 9. As with the main stems and leaves seen in FIGS. 5 and 6, the two half planar members are joined by connecting tabs 49 which are removed after painting by a stamping operation.

After the two half planar members are parted as seen in FIG. 9, the cross stem 42 of each planar member has the leaves 43 pendent therefrom at intervals as seen. Each of the stems 42 is provided with aligned notches 51 and 52, these being disposed half-way between adjacent cross leaves 43, see also FIG. 13. The upper edge of the cross stem 42 is also notched as at 53, in a fashion similar to notch 51, at a point on a vertical axis midway of each leaf 43.

The aforesaid notches on cross stem 42 are adapted to cooperate with the previously described notches on the main stems 36, and with locking structures also thereon. Cross stem 42 is adapted to move in the slot 47 on main stem 36 and the notches 51 and 52 of cross stem 42 are adapted to interlock respectively with notches 54 and 56 at the inner end of slot 47. Cross stem 42, in moving to the locked position at the inner end of slot 47, moves past a locking ramp 57, see also FIG. 11, the material of stem 42 deforming elastically in moving therepast and to the inner end of slot 47.

The notches 53 on the upper edge of cross stem 42 are adapted to move over a locking device 58 consisting of a locking tang 59 and into a slot 62, as seen more clearly in FIG. 12, disposed between locking tang 59 and a tang 61 of larger height flanking slot 62. The metal at slot 53 is adapted to interengage with the metal at slot 62, the metal of stems 36 and 42 elastically deforming in moving to the locked position.

The manner of assembling the main stems 36 to the cross stems 42 with the leaves 37 and 43 presenting the reticular pattern seen in FIG. 4 constitutes one of the important features of the invention. The mode of assembly is perhaps best seen with respect to FIGS. 14 to 21 wherein there is shown an assembly fixture indicated generally by reference numeral 65 and comprising a pair of longitudinally extending stringer members 66 connected by laterally spaced stretchers 67.

Figure 15:
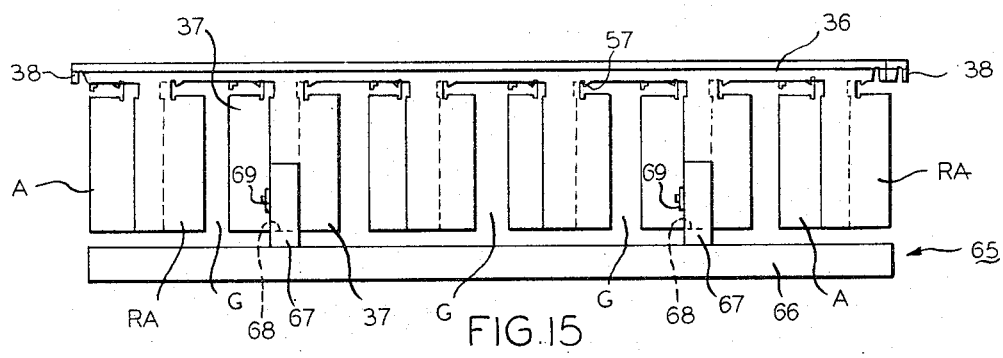
FIG. 15 is a front elevational view thereof.
Figure 16:
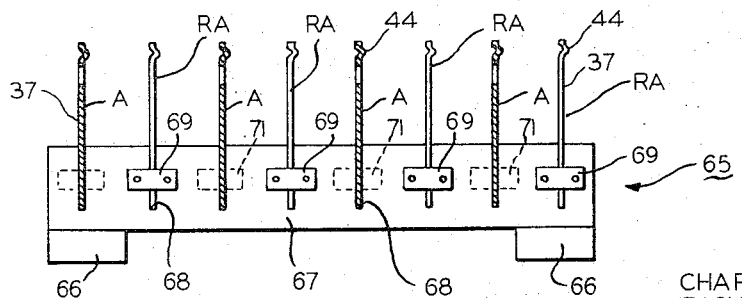
FIG. 16 is a sectional view taken along the line 16—16 of FIG. 14 looking in the direction of the arrows.

As seen in FIGS. 14 to 16, the stretchers 67 are slotted as at 68 to receive the leaves 37 of the main stem 36. In assembling a light reflecting and shielding module 30, the main stems 36 are arranged in the slots 68 with alternate rows of the main stems 36 reversed end for end. That is to say, rows A are arranged in slots 68 as seen in FIG. 5, while rows RA are in reversed end for end position compared to FIG. 5. The placement of rows A and RA in slots 68 is determined by stops 69 for rows RA secured to one side of stretchers 67, and by stops 71 secured to the other side of stretchers 67. Leaves 37 of rows A contact stops 71, while leaves 37 of rows RA contact stops 69.

As seen particularly in FIG. 15, this placement of rows A and RA as described provides a series of gates G through which the cross stems 42 may be introduced. The cross stems 42, however, are first arranged as reversed pairs C and RC as seen in FIG. 18. The leaves 43 of the cross stems 42 and the stems 42 are moved to a position as seen in FIG. 4 to provide the reticular pattern shown.

Figure 19:
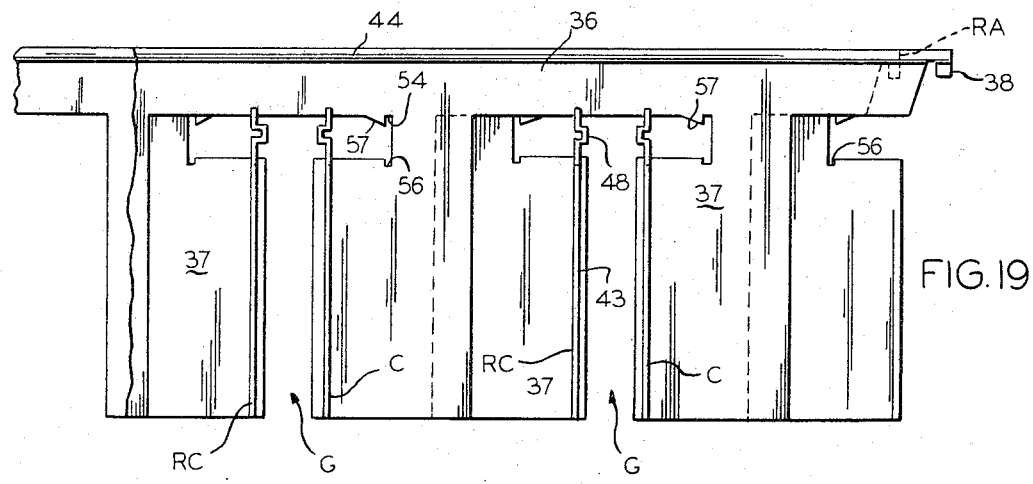
FIG. 19 is an enlarged scale detailed elevational view of the main leaves and stems in a shifted position for initial locking and assembly of the cross stems and leaves thereto.
Figure 20:
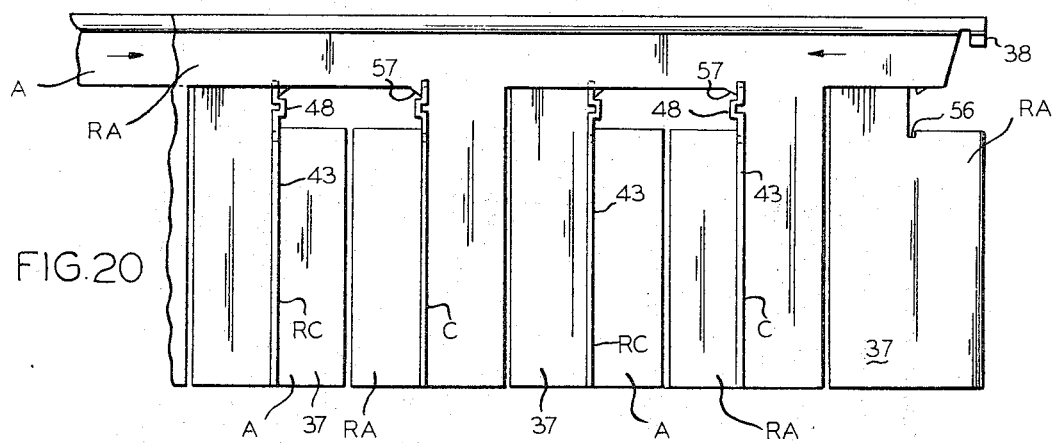
FIG. 20 is a view similar to FIG. 19, but showing the completion of the shifting of the main stems and leaves, and the final assembled relationship of the cross stems and leaves with the main stem and leaves.
Figure 21:
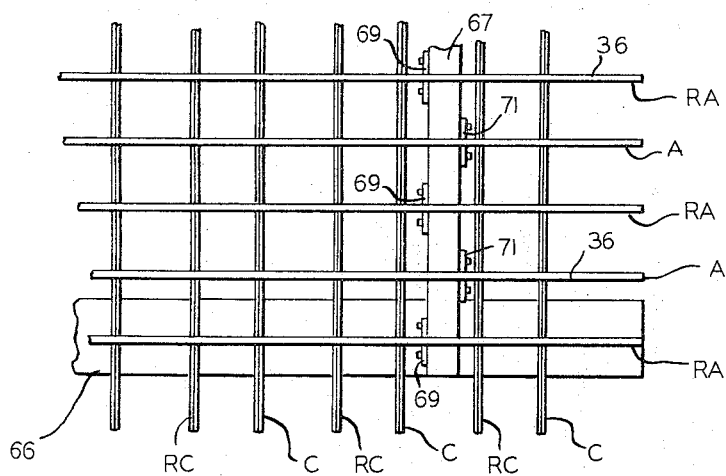
FIG. 21 is a view similar to FIG. 14, showing the assembly fixture, and the cross stems and leaves in assembled relationship with the main stems and leaves.

The module 30 is completed by moving the reversed pairs C and RC laterally away from each other, the stems 42 being moved into the slots 47 of the main stems 36, see FIG. 19. The latter are shifted in their assembly fixture 65 to close the gate G, the movement of the main stems being shown in FIG. 20. The reversed pairs C and RC are continued to be separated laterally until they lock with main stems 36.

Cross stem rows C lock up with the notches 51 and 52 thereof in engagement with the notches 54 and 56 at the inner ends of slots 47 in rows A. In between such rows A, cross stems C also lock up with rows RA, notches 53 of cross stems rows C locking up with slots 62 of such row RA.

Likewise, reversed cross stem rows RC, have the notches 53 thereof locking up with slot 62 of row A. Reverse cross stem rows RC have the notches 51 and 52 thereof locking with the inner ends of slots 47 in row RA.

When the locking up of the elements is accomplished as described, there results a module 30 readily adapted to be mounted within or supported from the grid modules 32. The structure described can be shipped KD with an assembly fixture 65 also shipped KD. When fixture 65 is assembled on the job site, the main stem rows A and RA can be properly disposed therein. Cross stems rows C and RC are then inserted into the gates G provided by the aforedescribed orientation of main stem rows A and RA, and laterally separted to commence an initial locking up of cross stem rows C and RC with the main stem rows A and RA.

The assembly 30 completed in the fixture 65 is a rigid one by reason of the many points of interlocking of the cross stems with the main stems. Each module 30 is exceedingly light in weight, and the elements comprising the same can be made of light gauge aluminum, painted or anodized as desired.

When the modules 30 are in position it is difficult to see the details of lighting or heating components located above the same. The many planar surfaces comprising the module 30 diffuse the overhead light, greatly minimizing any glare.

By reason of the recticular effect of the main and cross stems a valuable acoustic effect is provided, greatly lowering the intensity of overhead sound reflection.

Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

We claim:
1. A light reflecting and shielding module comprising main stem and leaf elements arranged in alternate end for end reversed rows, cross stem and leaf elements arranged in alternate end for end reversed rows, each of said main stem and leaf elements including a slot extending substantially midway of the width of each leaf element, each of said cross stem and leaf elements having a stem connecting the cross leaf elements, the stem of said cross stem and leaf element being substantially the width of said slot so as to enter therein, said main stem and leaf elements being first oriented to positions to present a gate extending laterally of said main stem and leaf elements when so oriented, said cross stem and leaf elements being adapted to be introduced into said gate as a pair thereof in reversed end for end relationship and being thereafter moved laterally of each other, the stem portion of said cross stem and leaf elements moving into said slots to the inner end thereof.

2. The invention according to claim 1 where the stem of said cross stem and leaf elements is provided with means cooperating with means at said slot for causing said elements to move into locking engagement.

3. The invention of claim 1 wherein that portion of the stem of said main stem and leaf elements substantially midway of the leaf elements is provided with locking structure cooperating with the stem portion of said cross stem and leaf elements midway of the leaf elements thereof.

4. The invention of claim 1 wherein said rows of said main stem and leaf elements are oriented to a position to close said gate with said cross stem and leaf elements in said slots for further movement to a locked position.

5. A light reflecting and shielding module comprising main planar members each having a stem and leaf elements pendent from said stem, cross planar members having a stem and leaf elements pendent from said stem, each of said main leaf elements including a slot extending substantially midway of the width thereof, the stem of said cross planar member being substantially the width of said slot so as to enter therein, said main planar members including the stem and leaf elements being first oriented to positions to present a gate extending laterally of said main planar members, said cross planar members having the stem and leaf elements thereof adapted to be introduced into said gate as a pair thereof and thereafter moved laterally of each other, the stems of said cross planar members moving into said slots to the inner end thereof.

6. The invention of claim 5 wherein the stems of said planar members are provided with longitudinal extending ribs to provide stiffness thereto.

7. The invention according to claim 5 where the stems of said cross planar members are provided with means cooperating with means at said slots for causing said cross planar members to move into locking engagement.

8. The invention of claim 5 wherein that portion of the stem of said main planar members substantially midway of the leaf elements thereof is provided with locking structure cooperating with the stem of a cross planar member midway of the leaf elements thereof.

9. The invention of claim 5 wherein said rows of said main planar members are oriented to a position to close said gate with said cross planar members having the stem thereof in said slots for further movement to a locked position.

10. A light reflecting and shielding module comprising planar elements arranged in alternate end for end reversed rows, cross planar elements arranged in alternate end for end reversed rows, each of the planar elements of each row having slots therein extending substantially midway of the width of each planar element, each of said cross planar elements having portions thereof adapted to enter said slots, said first planar elements being oriented to a position to present a gate extending laterally thereof, said cross planar elements being adapted to be introduced into said gate as a pair thereof in reversed end for end relationship and being thereafter moved laterally of each other in locking engagement with said first named planar elements.

11. The invention according to claim 10 wherein said slots and said portions of said cross planar elements are provided with cooperating locking means.

12. The method of constructing a light reflecting and shielding structure which comprises mounting a plurality of main planar members having slotted elements pendent from the stem elements thereof in an assembly fixture, reversing end for end alternate rows of said planar members so as to present an entrance gate extending transversely of said planar members, inserting cross planar members having elements pendent from stem elements thereof; shifting said cross planar elements laterally of themselves whereby the stem elements thereof enter the slots of said main planar members.

13. The method according to claim 12 wherein said main planar members are shifted in said fixture to a first position to present said entrance gate, and wherein said main planar members are shifted to a second position to close said entrance gate.

14. The method of claim 12 wherein the cross planar members are moved laterally of themselves a further distance to complete the movement of the stems thereof in the slots of said main planar members.

15. The method of claim 12 wherein said cross planar members are alternately reversed end for end, and are inserted into said entrance gate as a pair thereof in side by side relationship prior to shifting the cross planar members laterally of themselves.

References Cited

UNITED STATES PATENTS

| | | | |
|---|---|---|---|
| 1,996,047 | 3/1935 | Green | 52—667 |
| 2,031,779 | 2/1936 | Ladd | 52—669 |
| 2,645,985 | 7/1953 | Beebe et al. | 52—668 |

DAVID J. WILLIAMOWSKY, *Primary Examiner.*

R. D. KRAUS, *Assistant Examiner.*